(12) United States Patent
Aragones et al.

(10) Patent No.: US 8,115,424 B2
(45) Date of Patent: Feb. 14, 2012

(54) METHOD AND DEVICE FOR CONTROLLING THE ROTATION SPEED OF A PIEZOELECTRIC MOTOR ROTOR

(75) Inventors: Julien Aragones, Paris (FR); Jacques Robineau, Paris (FR)

(73) Assignee: Sagem Defense Securite, Paris (FR)

( * ) Notice: Subject to any disclaimer, the term of this patent is extended or adjusted under 35 U.S.C. 154(b) by 349 days.

(21) Appl. No.: 12/373,635

(22) PCT Filed: Jul. 10, 2007

(86) PCT No.: PCT/FR2007/051635
§ 371 (c)(1),
(2), (4) Date: Nov. 9, 2009

(87) PCT Pub. No.: WO2008/007017
PCT Pub. Date: Jan. 17, 2008

(65) Prior Publication Data
US 2011/0285329 A1 Nov. 24, 2011

(30) Foreign Application Priority Data
Jul. 13, 2006 (FR) .................................. 06 06438

(51) Int. Cl.
*H01L 41/04* (2006.01)
(52) U.S. Cl. ........ 318/116; 318/257; 318/268; 318/277; 318/278; 318/279

(58) Field of Classification Search ............. 318/116, 318/257, 268, 277, 278, 279
See application file for complete search history.

(56) References Cited

U.S. PATENT DOCUMENTS

| | | | |
|---|---|---|---|
| 5,477,100 A | 12/1995 | Kataoka | |
| 6,411,008 B1 | 6/2002 | Otsubo et al. | |
| 6,437,481 B2 | 8/2002 | Senda et al. | |
| 7,352,108 B2 * | 4/2008 | Diefenbach et al. | 310/316.02 |

FOREIGN PATENT DOCUMENTS

| | | |
|---|---|---|
| FR | 2 769 149 | 4/1999 |
| WO | WO 2008/007017 | 1/2008 |

OTHER PUBLICATIONS

International Search Report for related International Application No. PCT/FR2007/051635; report dated Apr. 16, 2008.

* cited by examiner

*Primary Examiner* — Walter Benson
*Assistant Examiner* — David Luo
(74) *Attorney, Agent, or Firm* — Miller, Matthias & Hull LLP

(57) ABSTRACT

The present invention relates to a method of controlling the speed of rotation of a piezoelectric motor comprising at least one step of determining the variation of the speed of rotation as a function of the frequency of the excitation voltages of the piezoelectric motor for the actual temperature of the piezoelectric material.

5 Claims, 5 Drawing Sheets

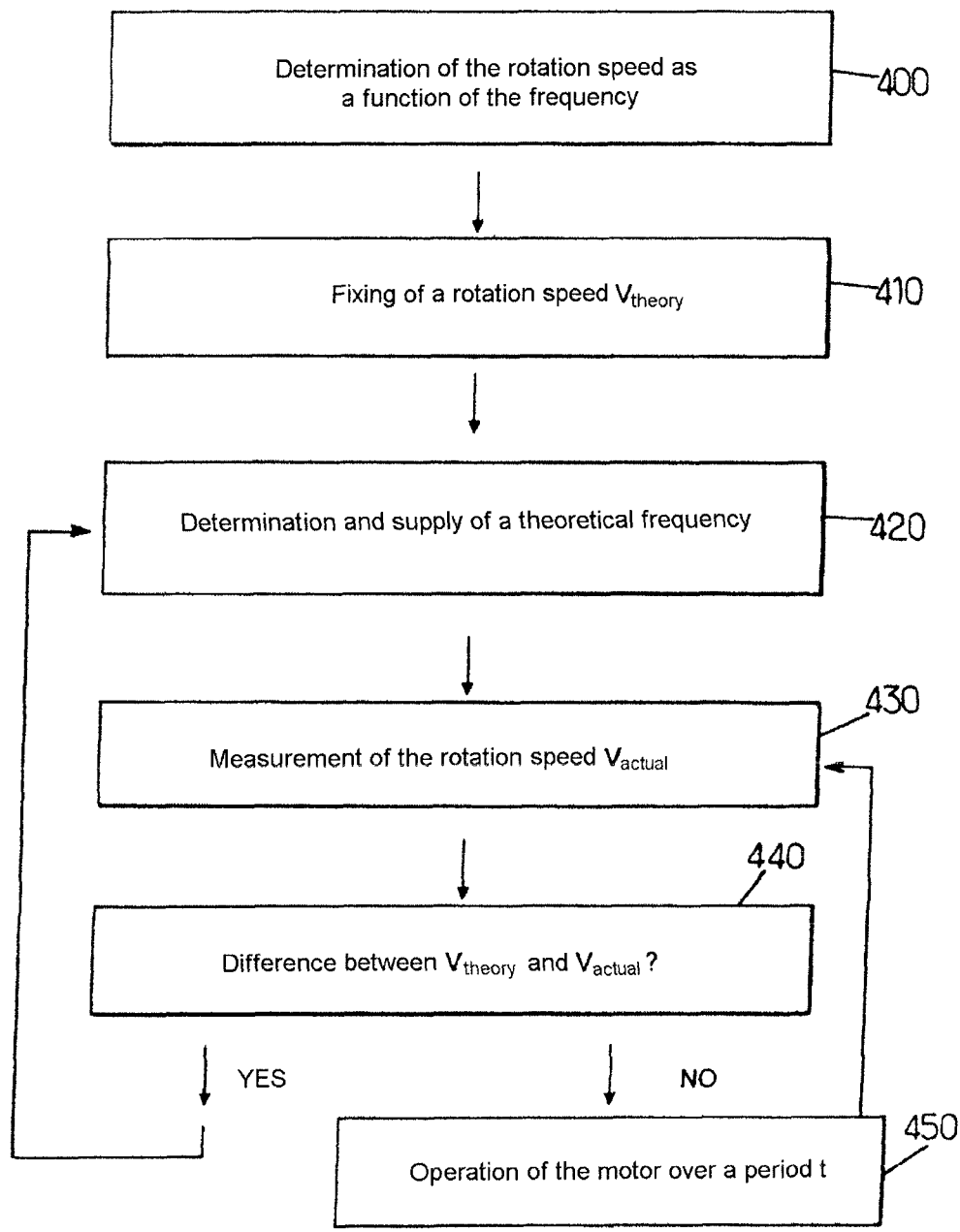

METHOD AND DEVICE FOR CONTROLLING THE ROTATION SPEED OF A PIEZOELECTRIC MOTOR ROTOR

CROSS-REFERENCE TO RELATED APPLICATIONS

This application is a U.S. national stage filing of International Patent Application No. PCT/FR2007/051635 filed on Jul. 10, 2007, which claims priority under the Paris Convention to French Patent Application No. 06 06438, filed on Jul. 13, 2006.

FIELD OF THE DISCLOSURE

The present invention relates in general to the field of rotary piezoelectric motors and, more specifically, it relates to a method of controlling the rotation speed of a piezoelectric motor.

BACKGROUND OF THE DISCLOSURE

In a rotary piezoelectric motor, also called rotary traveling-wave motor, the driving of a rotor is due to the friction of the teeth of the stator on the contact surface of the rotor, the motor comprising piezoelectric stator excitation means suitable for exciting the stator and causing the rotary movement of the rotor.

FIG. 1 of the appended drawings shows very schematically a simplified structure of a rotary piezoelectric motor limited to the principal members relevant to the invention. The rotor 1 takes the general form of a wheel having an annular contact pad 2 joined by a web 3 to a central hub 4. The stator 5 takes the general form of a stationary annular structure comprising an annular stator ring 6 which possesses a cogged surface 9 on which the contact pad 2 bears, which surface is supported while cantilevered to the outside, on an annular base 7 via a stator rim 8 extending substantially radially, the piezoelectric ceramic material 10 being fixed beneath the stator ring 6 on the opposite side from the cogged surface 9.

Thus, the rotor is driven by friction of the teeth of the stator 5 on the contact surface of the rotor 1.

FIG. 2 shows a pattern of the distribution of the piezoelectric elements beneath the stator ring 6 according to the prior art, the piezoelectric material 10 then taking the form of a piezoelectric ring with two excitation sectors, usually called "excitation electrodes", namely a sector A corresponding to a sinusoidal excitation mode and a sector B corresponding to a cosinusoidal excitation mode, that is to say the piezoelectric sector A is excited under an excitation voltage of the k sin ωt type and the piezoelectric sector B is excited under a voltage of the k cos ωt type, k being a constant, t being the time and ω the period. The two excitation voltages are therefore offset by π/2 from each other and have the same excitation frequency.

Each excitation sector comprises a plurality of alternately biased piezoceramic segments $a_1$-$a_6$, $b_1$-$b_6$.

Thus, considering two adjacent alternate piezoelectric segments and by exciting them with the same voltage, one is made to contract and the other to expand. This results in the deformation of the surface of the stator 5, forming a standing wave, each piezoelectric segment of the piezoelectric sectors A, B having the same peripheral length corresponding to a half-wavelength λ/2 of the standing wave generated by the excitation of the piezoelectric sector A, B.

Thus, the excitation sectors A, B each allow a standing wave to be generated with the same wavelength λ.

The two piezoelectric sectors A, B are separated by a sector S which is not excited by an excitation voltage, with a peripheral length corresponding to a quarter-wavelength λ/4, these sectors being excited with excitation voltages offset by π/2 from each other.

Thus, the two standing waves generated by the excitation sectors A, B on the piezoelectric ring 10 are offset from each other by a quarter-wavelength λ/4.

Superposition of the two standing waves results in the formation of a traveling wave with a wavelength λ moving along the piezoelectric ring; consequently this wave also causes the deformation of the stator ring 6 to which the piezoelectric ring 10 is fixed, with the formation of a traveling wave moving over the stator ring 6.

By forming a traveling wave, it is possible to create small elliptical movements in the cogged surface 9 of the stator ring 6, which, by friction, causes the rotor 1 to rotate in a movement direction opposite to the direction of movement of the traveling wave.

The operating principle of a piezoelectric motor using a stator and a rotor as described above is well known (see for example U.S. Pat. No. 6,674,217).

The transmission of the rotation movement of the traveling wave to the rotor is based on the friction of the cogged surface 9 on the rotor 1; this friction, which has an efficiency of 30 to 40%, causes the temperature to rise, the temperature rise acting in particular on the internal stresses of the stator resulting from bonding the piezoelectric material to the stator.

Thus, the piezoelectric material reacts differently as to whether the temperature is higher or lower.

Owing to its being heated, it is therefore relatively difficult for the rotation speed of the motor to be controlled accurately during continuous operation of the motor.

Thus, if the user desires to operate the piezoelectric motor at a fixed rotation speed, the means for regulating the speed do not automatically take into account the temperature rise of the piezoelectric material, and the actual rotation speed of the piezoelectric motor is different from the required rotation speed.

The common practice is therefore to control the motor by controlling the excitation voltages of the two excitation sectors.

Thus, to modify the rotation speed of the motor over the course of time, it is common practice to modify the variable parameters of the excitation voltages, especially by modifying, independently or in a combined manner, the frequency and the amplitude of the excitation voltages and/or the phase and the amplitude of the excitation voltages.

However, this way of controlling the rotation speed of the motor as a function of at least two parameters is relatively complex to implement and does not take into account the modifications in temperature of the mode of operation of the piezoelectric ceramic.

It will therefore be particularly advantageous to be able to regulate the rotation speed of the motor according to a method that takes into account the temperature modification of the piezoelectric material.

SUMMARY OF THE DISCLOSURE

The object of the present invention is to solve this problem using a method of regulating the rotation speed of a piezoelectric motor that takes into account the temperature of the piezoelectric material and therefore that makes it possible to automatically modify the parameters for controlling the piezoelectric motor as a function of the required rotation speed and of the actual rotation speed.

The present invention relates to a method of controlling the rotation speed of a rotor of a piezoelectric motor supplied by at least two excitation voltages each exciting an excitation sector of the piezoelectric material, the two excitation voltages being able to be varied using variable physical parameters comprising the frequency, the amplitude and the phase difference of the two excitation voltages, characterized in that it comprises at least the following successive steps:

step of determining the variation in the rotation speed of the piezoelectric motor rotor as a function of one of the variable physical parameters, the other parameters being fixed, for a reference temperature;

step of fixing a rotation speed;

step of determining, and supplying the motor with, the excitation voltages at the theoretical value of said variable physical parameter;

step of measuring the actual rotation speed;

step of calculating the difference between the theoretical rotation speed and the actual rotation speed;

if the difference is less than a threshold value, then, after a hold time, the method recommences at said step of measuring the actual rotation speed;

if the difference is greater than a threshold value, then the method comprises the following additional steps:

step of determining the difference between the actual temperature and the reference temperature;

step of determining the variation in the rotation speed as a function of said variable physical parameter for the actual temperature;

step of modifying said variable physical parameter; and return to said step of determining, and supplying the motor with, the excitation voltages at the theoretical value of said variable physical parameter.

According to one advantageous embodiment of the invention, the variable physical parameter is the frequency of the excitation voltages.

Advantageously, the variation in the rotation speed of the piezoelectric motor as a function of said variable physical parameter follows a Gaussian law.

Advantageously, the temperature variation of the rotation speed of the piezoelectric motor as a function of the frequency of the excitation voltages is linear for a fixed amplitude and a fixed phase difference of the excitation voltages.

The present invention also relates to a device for controlling the rotation speed of a piezoelectric motor rotor operating according to the method having the abovementioned features.

BRIEF DESCRIPTION OF THE DRAWINGS

The present invention will now be described by means of a purely illustrative embodiment that in no way limits the scope of the present invention, on the basis of the appended illustrations in which:

FIG. 4 is a flowchart of the principal steps of the method according to the prior art of regulating the rotation speed of a piezoelectric motor as a function of the frequency of the excitation voltages;

DETAILED DESCRIPTION OF THE DISCLOSURE

Figure 1:
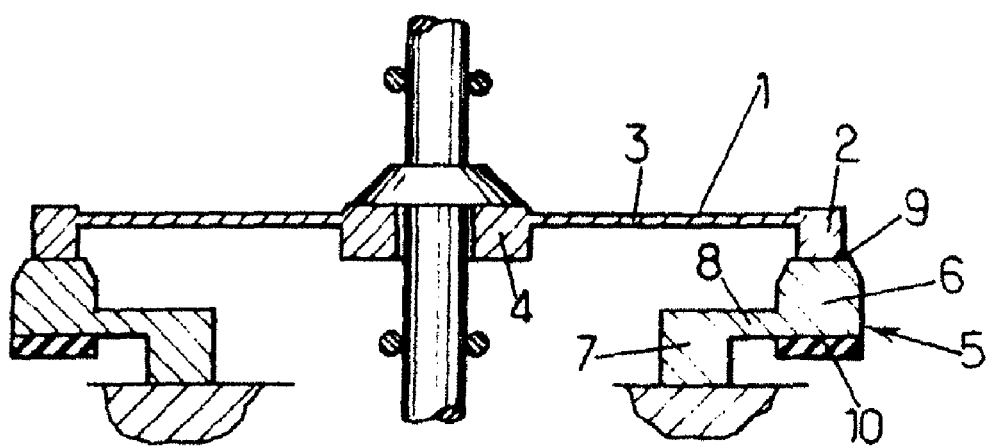
FIG. 1 is a schematic view showing the principal operating members of a piezoelectric motor.
Figure 2:
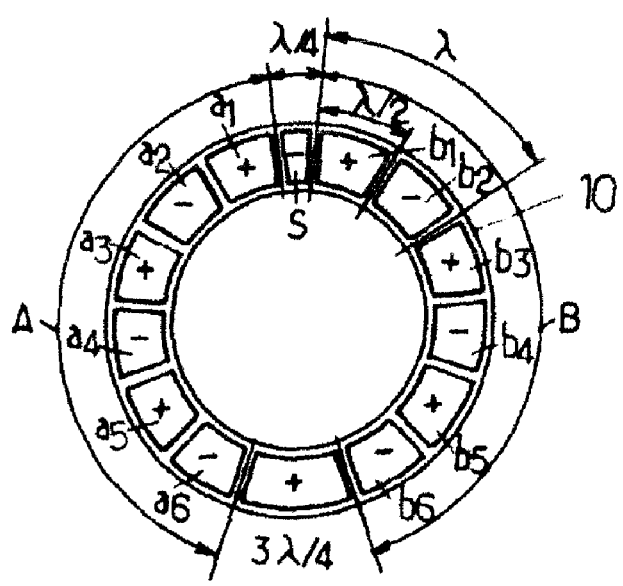
FIG. 2 is a schematic representation of the arrangement of the excitation sectors of a piezoelectric ring used according to the prior art.
Figure 3:
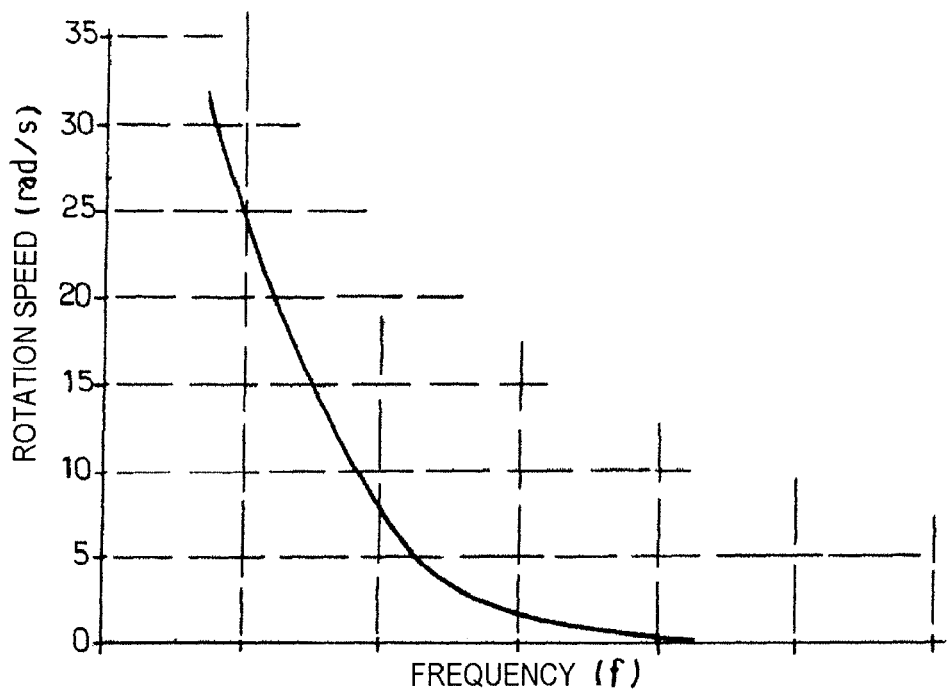
FIG. 3 is a graph showing the variation in the rotation speed of a piezoelectric motor as a function of the frequency of the excitation voltages.

FIG. 3 is a graph of the variation in the rotation speed of a piezoelectric motor of type known per se as a function of the frequency of the excitation voltages.

Thus, to determine the rotation speed of the piezoelectric motor, the corresponding frequency of the excitation voltages of the excitation sectors A, B of the piezoelectric ring is determined for a given speed value.

The present Applicant has discovered that, for a fixed excitation voltage amplitude and a phase difference between the two excitation voltages of $\pi/2$, the variation in the rotation speed $\Omega$ as a function of the frequency f of the excitation voltages follows a Gaussian law $\Omega=A\exp(Bf^2-C^2)$ corresponding to the resonance of the stator, with A, B and C unknown variables.

Because the amplitude of the excitation voltage is fixed and the phase difference between the two excitation voltages is also fixed, it is only possible to modify the frequency f of the excitation voltages.

However, it is also possible to modify the control voltage by varying the amplitude of the excitation voltages, when fixing the phase difference and the frequency, or by varying the phase difference of the excitation voltages, when fixing the amplitude and the frequency. This is because the variation in the rotation speed $\Omega$ as a function of the amplitude of the excitation voltages also follows a Gaussian law for a fixed phase difference and a fixed frequency, as does the variation in the rotation speed $\Omega$ as a function of the phase difference of the excitation voltages for a fixed frequency and a fixed amplitude.

FIG. 4 shows a flowchart illustrating the principal steps of a method of controlling the rotation of a piezoelectric motor currently employed for regulating the rotation speed over the course of time.

During a prior first step (step 400), the variation in the rotation speed of the piezoelectric motor as a function of the frequency of the excitation voltages is determined (the amplitude and the phase difference both being fixed), this variation being represented by way of example in the graph of FIG. 3.

Next, the user fixes the rotation speed $V_{actual}$ that he wishes to achieve using the piezoelectric motor (step 410).

Because the variation in the speed as a function of the frequency of the excitation voltages has been determined in step 400, the user can then determine and fix the frequency of the excitation voltages that have to be applied to the piezoelectric motor in order to have the fixed rotation speed $V_{actual}$ (step 420).

The rotor of the piezoelectric motor therefore has a theoretical rotation speed $V_{theory}$.

As explained above, there is a drift in the mode of operation of the piezoelectric motor because of the piezoelectric ceramic heating up, the piezoelectric motor having a higher rotation speed at low temperature and a lower rotation speed at high temperature for a given frequency of the excitation voltages.

It is very difficult to measure as such the temperature of the piezoelectric material. Thus, the only means currently known for compensating over the course of time for the rotation speed of the piezoelectric motor consists in measuring the actual rotation speed (step 430) and calculating if there is a difference between the theoretical desired rotation speed $V_{theory}$ and the actual rotation speed $V_{actual}$ (step 440). In the case of a positive response and if the difference between these two speeds exceeds a certain drift acceptability threshold, then it is necessary to modify the frequency of the theoretical excitation voltages of the excitation sectors. The method then recommences at step 420.

If the difference between the desired rotation speed and the actual rotation speed is zero or negligible, then the piezoelectric motor is permitted to operate over a time period t during which the operating parameters of the motor are not modified (step 450). After this lapse of time, the actual rotation speed is again measured (step 430) and the difference between the actual rotation speed and the theoretical rotation speed is again calculated (step 440).

According to this method, the temperature variations are not taken into account, hence a speed regulation that is not very uniform over the course of time and that is complicated to implement.

Figure 5:
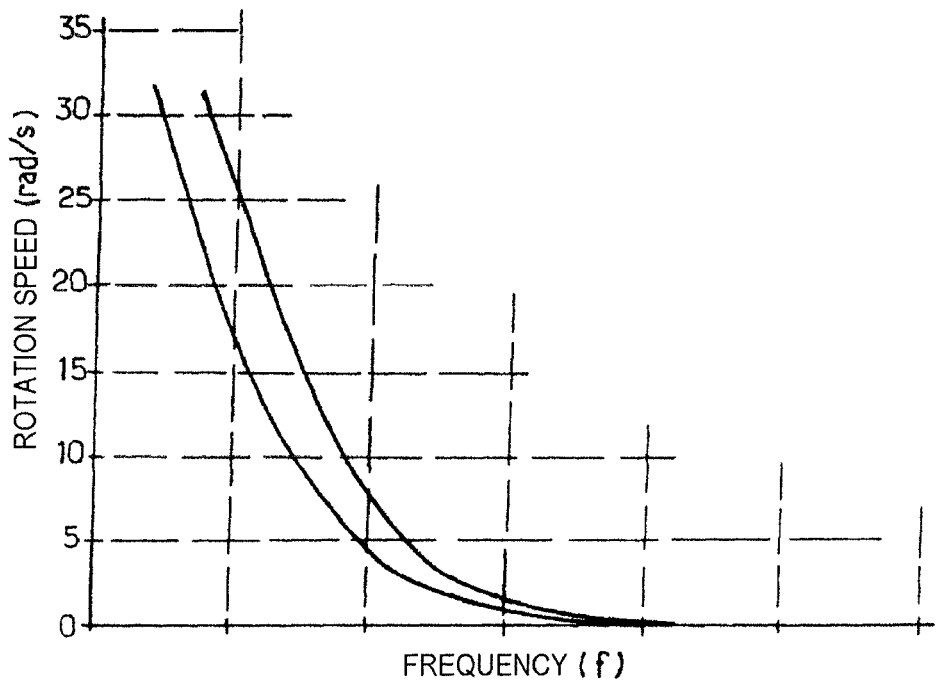
FIG. 5 is a graph showing the variation in the rotation speed of a piezoelectric motor as a function of the frequency of the excitation voltages for two temperatures of the piezoelectric material.

FIG. 5 shows a graph illustrating the variation in the rotation speed of a piezoelectric motor as a function of the variation in frequency of the excitation voltages (the amplitude and the phase difference of the excitation voltages are fixed), for two given temperatures of the piezoelectric material.

The present Applicant has discovered that the unknown C in the equation for the variation in the rotation speed as a function of the frequency of the excitation voltages $\Omega = A \exp(Bf^2 - C^2)$ depends linearly, to a first degree, on the temperature.

Thus, the curve showing the variation in the rotation speed as a function of the frequency of the excitation voltages (for a fixed phase difference and a fixed amplitude) shifts linearly with the temperature on the graph showing the rotation speed as a function of the frequency.

Thus, as is apparent in FIG. 5, the variation in the rotation speed as a function of the frequency of the excitation voltages for two temperatures has been determined and it has been found experimentally that two curves can be substantially superposed by simply shifting one of the curves translationally onto the other.

The modification in temperature of the piezoelectric material therefore linearly influences the variation in the rotation speed of the piezoelectric motor as a function of the frequency of the excitation voltages (the amplitude and the phase difference of the excitation voltages both being fixed). This results in a translation of shift of the graph illustrating this variation.

Figure 6:
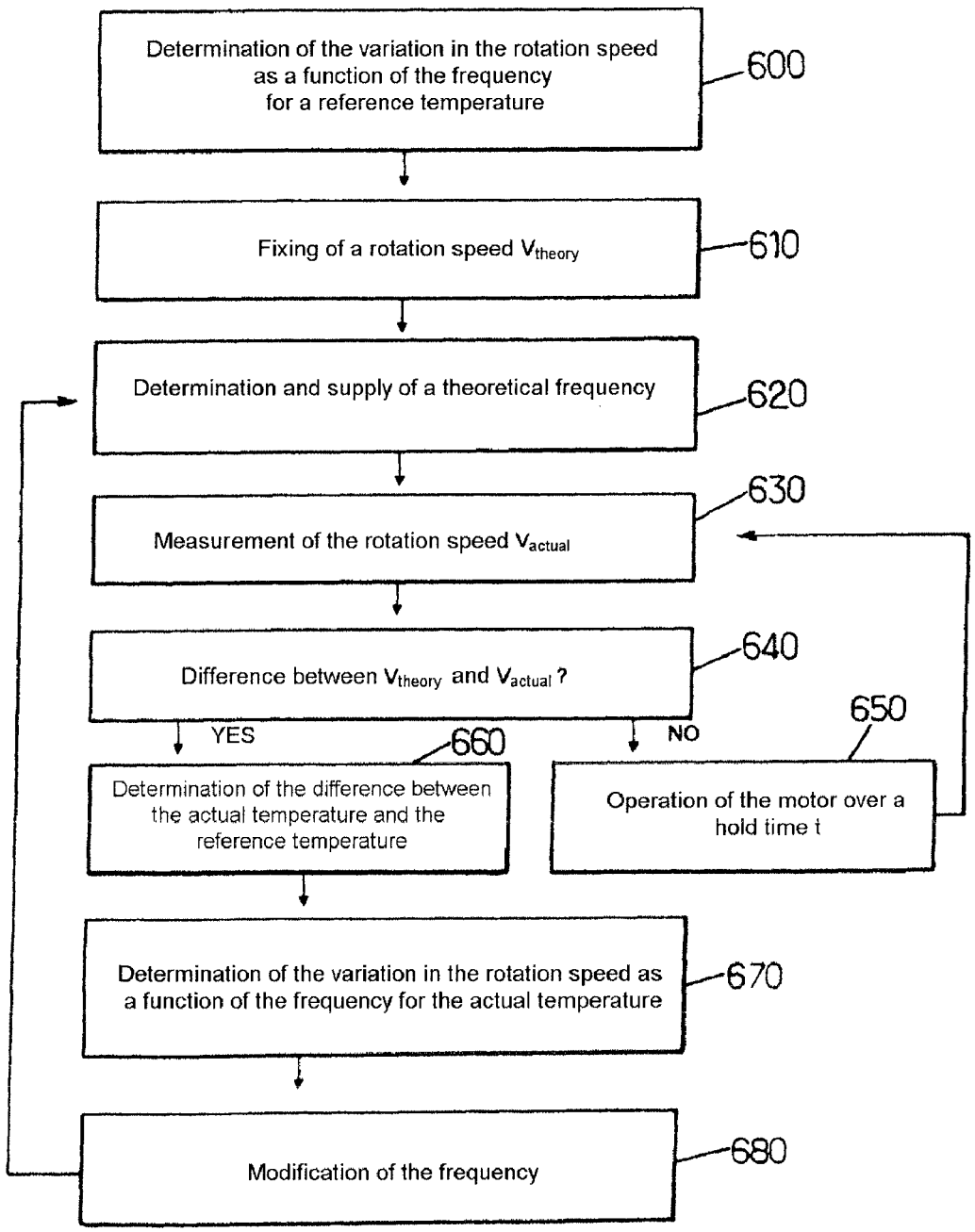
FIG. 6 is a flowchart for the principal steps of the method according to the invention of regulating the rotation speed of a piezoelectric motor.

FIG. 6 is a flowchart for the principal steps of the method according to the invention for controlling the rotation speed of the piezoelectric motor, the method according to the invention being based on the linear behavior at the temperature of the variation in the rotation speed of the piezoelectric motor as a function of the frequency of the excitation voltages.

In a preliminary step, the variation in the rotation speed of the rotor of the piezoelectric motor as a function of the frequency of the excitation voltages is determined for a reference temperature (step 600), the amplitude and the phase difference of the excitation voltages both being fixed.

Next, the rotation speed $V_{theory}$ at which the user desires to operate the piezoelectric motor is fixed (step 610).

Due to predetermining the variation in the rotation speed as a function of the frequency of the excitation voltages, having fixed the rotation speed, the theoretical reference frequency is then determined (step 620).

The piezoelectric motor is then turned on and the actual rotation speed $V_{actual}$ of the motor is measured (step 630).

The difference between $V_{theory}$ and $V_{actual}$ is then calculated (step 640). If the difference between these two values does not exceed an acceptable threshold value, then the motor is permitted to operate over a certain hold time t (step 650) and then the rotation speed $V_{actual}$ after this lapse of time is again measured, and the procedure therefore returns to the step of measuring the rotation speed of the piezoelectric motor (step 630). In general, the hold time t corresponds to a sampling period.

If the difference between $V_{theory}$ and $V_{actual}$ is too great, owing to the linear behavior at the temperature of the variation in the rotation speed as a function of the frequency of the excitation voltages, the temperature difference between the reference temperature and the actual temperature is determined (step 660).

Figure 7:
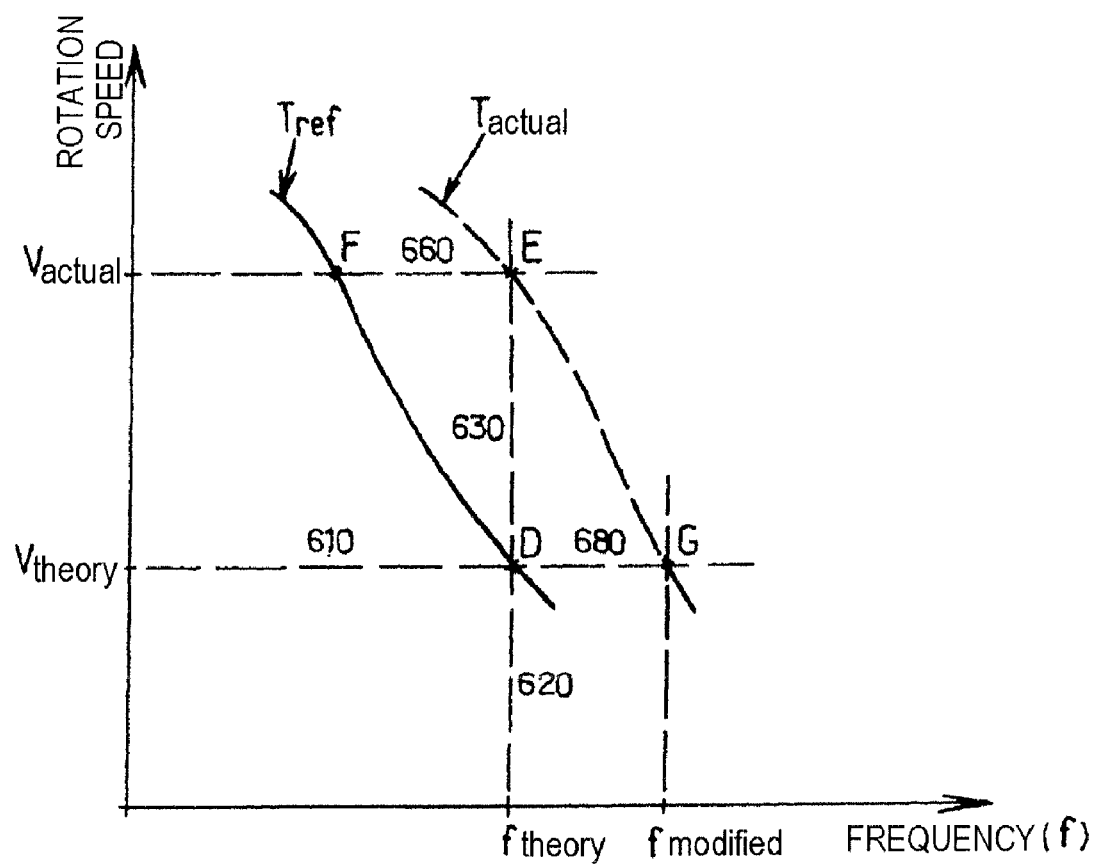
FIG. 7 illustrates theoretically part of the means for implementing the method according to the invention using a graph of the variation in the rotation speed as a function of the frequency of the excitation voltages for a reference temperature $T_{ref}$ and for an actual temperature $T_{actual}$.

FIG. 7 shows more precisely the way of determining the value of this temperature difference.

FIG. 7 in fact shows a first curve representing the variation in the rotation speed as a function of the frequency of the excitation voltages for a reference temperature $T_{ref}$ (solid curve). This curve is generated during step 600 of determining the rotation speed of the piezoelectric motor as a function of the frequency of the excitation voltages for a reference temperature with the fixed amplitude and fixed phase difference of the excitation voltages.

The theoretical rotation speed $V_{theory}$ for this reference temperature is then fixed (step 610). By determining the position of the point D on the reference temperature curve, the theoretical frequency $f_{theory}$ of the excitation voltages is then determined (step 620).

By measuring the actual rotation speed $V_{actual}$ of the piezoelectric motor, the position of the point E is determined (step 630) as is the difference between the actual temperature $T_{actual}$ and the reference temperature $T_{ref}$ (step 640). The position of the point F is therefore determined.

Because of the temperature linearity of the variation in the rotation speed as a function of the frequency of the excitation voltages, since the temperature difference and the position of the point E are known, it is possible to plot the curve showing the variation in the rotation speed as a function of the frequency of the excitation voltages for the actual temperature (dotted curve in FIG. 7, which passes the point E). It is merely a question of translationally shifting the curve plotted for the reference temperature until this curve passes through the point E (step 670).

It is then possible to modify the frequency $f_{modified}$ of the excitation voltages by determining the position of the point G on the actual temperature curve from the desired theoretical rotation speed (step 680).

Moreover, the actual temperature curve corresponding to the variation in the rotation speed as a function of the frequency of the excitation voltages is determined by a linear approximation, that is to say by translationally shifting the curve, given that it is possible to determine more precisely the function to be applied to the reference temperature curve in order to obtain the actual temperature curve, given that in the embodiment described above this function is linear.

In addition, if the resonant modes of the motor are relatively close to the curve of variation of the rotation speed as a function of the frequency of the excitation voltages for a reference temperature, it is possible, upon determining the actual temperature curve, to change resonant mode and in particular, upon translationally shifting the reference temperature curve, to interfere with a resonant mode.

It is then necessary to change mode, by modifying the sign of the correction.

The present invention also relates to a device for controlling the rotation speed of a piezoelectric motor rotor operating according to the method as described above.

The present invention has been described on the basis of the variation in the rotation speed of the rotor of the piezoelectric motor as a function of the frequency of the excitation voltages, the other variable physical parameters of the excitation voltages having been fixed, namely the amplitude and the phase difference of the excitation voltages. However, it is also possible to determine the variation in the rotation speed of the piezoelectric motor as a function of the amplitude of the excitation voltages, both the phase difference and the frequency then being fixed, or else, alternatively, as a function of the phase difference of the excitation voltages, both the frequency and the amplitude of the excitation voltages being fixed. It is therefore possible to apply the principle according to the invention on the basis of these variations.

The invention claimed is:

1. A method of controlling the rotation speed of a rotor of a piezoelectric motor supplied by at least two excitation voltages each exciting one respectively of at least two excitation sectors of the piezoelectric material, said two excitation voltages being able to be varied using variable physical parameters comprising the frequency, the amplitude and the phase difference of said two excitation voltages, the method comprising at least the following successive steps:

a step of determining the variation in the rotation speed of said piezoelectric motor rotor as a function of one of said variable physical parameters, all other of said parameters being fixed, for a reference temperature;

a step of fixing a rotation speed;

a step of determining, and supplying said motor with, excitation voltages a theoretical value of said variable physical parameter;

a step of measuring the actual rotation speed;

a step of calculating a difference between said theoretical rotation speed and said actual rotation speed;

if said difference is less than a threshold value, then, after a hold time, the method recommences at said step of measuring the actual rotation speed;

if the said difference is greater than a said threshold value, then the method comprises the following additional steps:

a step of determining a difference between an actual temperature and said reference temperature;

a step of determining the variation in said rotation speed as a function of said variable physical parameter for said actual temperature;

a step of modifying said variable physical parameter;

and a return to said step of determining, and supplying the motor with said excitation voltages at said theoretical value of said variable physical parameter.

2. The method as claimed in claim 1, wherein said variable physical parameter is the frequency of said excitation voltages.

3. The method as claimed in claim 1, wherein said variation in said rotation speed of said piezoelectric motor as a function of said variable physical parameter follows a Gaussian law.

4. The method as claimed in claim 1, wherein said temperature variation of said rotation speed of said piezoelectric motor as a function of said frequency of said excitation voltages is linear for a fixed amplitude and a fixed phase difference of said excitation voltages.

5. A device for controlling the rotation speed of a piezoelectric motor rotor operating according to the method as claimed in claim 1.

* * * * *